(12) United States Patent
St-Pierre et al.

(10) Patent No.: US 10,262,631 B1
(45) Date of Patent: Apr. 16, 2019

(54) LARGE SCALE HIGHLY DETAILED MODEL REVIEW USING AUGMENTED REALITY

(71) Applicant: Bentley Systems, Incorporated, Exton, PA (US)

(72) Inventors: Mathieu St-Pierre, Ste-Brigitte de Laval (CA); Marc-Andre Bouvrette, Québec (CA)

(73) Assignee: Bentley Systems, Incorporated, Exton, PA (US)

( * ) Notice: Subject to any disclaimer, the term of this patent is extended or adjusted under 35 U.S.C. 154(b) by 19 days.

(21) Appl. No.: 15/693,150

(22) Filed: Aug. 31, 2017

(51) Int. Cl.
| | |
|---|---|
| *G09G 5/391* | (2006.01) |
| *G09G 5/12* | (2006.01) |
| *H04L 29/06* | (2006.01) |
| *G06F 3/0484* | (2013.01) |
| *G06F 3/16* | (2006.01) |
| *G06F 3/01* | (2006.01) |

(52) U.S. Cl.
CPC ............. *G09G 5/391* (2013.01); *G09G 5/12* (2013.01); *H04L 67/38* (2013.01); *G06F 3/017* (2013.01); *G06F 3/04847* (2013.01); *G06F 3/167* (2013.01); *G09G 2340/0407* (2013.01); *G09G 2354/00* (2013.01); *H04L 67/42* (2013.01)

(58) Field of Classification Search
CPC ......................... G02B 21/0004; G01N 15/1468
USPC ......................................................... 345/428
See application file for complete search history.

(56) References Cited

U.S. PATENT DOCUMENTS

| | | | |
|---|---|---|---|
| 8,405,871 | B2 | 3/2013 | Smith et al. |
| 9,439,565 | B1 * | 9/2016 | Chai ........................ A61B 5/00 |
| 9,460,561 | B1 | 10/2016 | Côté et al. |
| 9,536,251 | B2 | 1/2017 | Huang et al. |
| 9,646,571 | B1 | 5/2017 | Côté et al. |
| 9,715,008 | B1 | 7/2017 | Côté et al. |

(Continued)

OTHER PUBLICATIONS

"Augmented (hyper)Reality: Augmented City 3D," Keiichi Matsuda, Keiichi Matsuda Ltd, accessed on Jul. 24, 2017, pp. one page.

(Continued)

*Primary Examiner* — Thomas J Lett
(74) *Attorney, Agent, or Firm* — Cesari and McKenna, LLP; James A. Blanchette

(57) ABSTRACT

In an example embodiment, a technique is provided for model review using augmented reality. An augmented reality device obtains tiles from a remote computing device for an overview resolution, and augments the model at the overview resolution and an overview view size into a physical environment at a data location. The augmented reality device displays the model augmented into the physical environment to a user disposed at a view location. In response to input requesting a change to the new resolution, the augmented reality device obtains additional tiles from the remote computing device for the new resolution, augments the model at the new resolution and a new view size into the physical environment, and displays the model augmented into the physical environment to the user disposed at the view location. In response to input that requests navigation of the model, the augmented reality device changes at least one of the data location or the view location. The display of the model may be synchronized with a second user of a second augmented reality device disposed at a second view location.

28 Claims, 12 Drawing Sheets

(56) References Cited

U.S. PATENT DOCUMENTS

| | | | | |
|---|---|---|---|---|
| 2007/0196028 A1* | 8/2007 | Kokemohr | ............... | G06T 11/00 |
| | | | | 382/254 |
| 2010/0250120 A1* | 9/2010 | Waupotitsch | ......... | G06T 3/4038 |
| | | | | 701/408 |
| 2014/0118405 A1* | 5/2014 | Chand | ................. | G06F 17/3087 |
| | | | | 345/661 |
| 2017/0053447 A1 | 2/2017 | Chen et al. | | |

OTHER PUBLICATIONS

Gray, Richard, "Be AR-fraid, very afraid! Augmented Reality Game Turns Your Home Into Horror Story Where Zombies and Demons Stalk You," Mail Oneline, Daily Mil, May 1, 2015, pp. 1-4.

Kim, Sung, et al., "Using Unity 3D to Facilitate Mobile Augmented Reality Game Development," 2014 IEEE World Forum on Internet of Things (WF-IoT), Mar. 2014, pp. 1-7.

Levy, Joshua, "Commercialization Opportunities and Threats of Augmented Reality on the Example of HoloLens," Master Thesis, M.SC. Governance of Science Technology and Innovation, Moscow, Russian Federation, Jun. 2016, pp. 1-69.

Liszewski, Andrew, "This Augmented Reality Future Looks Like a Living Hell," SPLOID, Gizmodo Media Group, May 19, 2016, pp. 1-3.

Marchand, Eric, et al., "Pose Estimation for Augmented Reality: A Hands-On Survey," IEEE Transactions on Visualization and Computer Graphics, Institute of Electrical and Electronics Engineers, vol. 22, No. 6, Dec. 1, 2016, pp. 2633-2651.

Mossel, Annette, et al., "ARTiFICe—Augmented Reality Framework for Distributed Collaboration," The International Journal of Virtual Reality, vol. 11, No. 3, Mar. 1, 2012, pp. 1-7.

"The Future of augmented Reality and Online Shopping," Augment, Jul. 5, 2016, pp. 1-3.

U.S. Appl. No. 13/945,552, filed Jul. 18, 2013 by Stéphane Côté, et al. for Dynamic and Selective Model Clipping for Enhanced Augmented Hypermodel Visualization, pp. 1-33.

* cited by examiner

LARGE SCALE HIGHLY DETAILED MODEL REVIEW USING AUGMENTED REALITY

BACKGROUND

Technical Field

The present disclosure relates generally to computer-based modeling, and more specifically to techniques for enabling large scale detailed model review using augmented reality.

Background Information

Various survey and computer aided design (CAD) tasks utilize large quantities of reality data that describe the physical environment. The reality data may be obtained from a variety of different sources, such as manual surveys, LiDAR, terrain models, etc. In order to more effectively utilize the reality data, a reality-based surface mesh may be reconstructed from the individual points described in the reality data. The reality-based surface mesh may represent the physical environment at a number of different resolutions or levels of detail (LODs), and thereby be characterized as a multi-resolution surface mesh.

While it is often useful simply to render a reality-based surface mesh and display it, further utility may be gained by combining the reality-based surface mesh with computer generated elements (e.g., computer aided design (CAD) objects) to create a combined model. The CAD objects may represent planned infrastructure (e.g., roads, bridges, pipelines, buildings, or other man-made structures), and the combined model may allow a user to visualize and make design adjustments to an infrastructure project. Depending on the implementation, the combined model may take the form of a three dimensional (3D) model, a two-and-a-half dimensional (2.5D) model, or another type of model. Where the reality-based surface mesh is a multi-resolution surface mesh, the combined model may be a multi-resolution model, capable of display at a number of different resolutions or LODs.

Models, such as a multi-resolution combined model of reality data and CAD objects, may cover large geographic areas (e.g., dozens of square kilometers), and can be very detailed (e.g., containing many millions of vertices). This large scale and high level of detail may present a number of issues that hinder display and user-navigation of such models, especially on electronic devices with limited processing, memory and storage capabilities, such as low-power augmented reality devices.

Some systems have been developed that attempt to display models using augmented reality on low-power augmented reality devices. However, such systems typically are only capable of displaying small scale models (e.g., up to a few square meters) at low levels of detail (e.g., containing a few thousand vertices). The focus of such systems has generally been to add relatively small virtual objects to a much larger view of the physical environment, for informational or entertainment purposes; not allowing user-navigation of large-scale, highly detailed models. If one were to attempt to use such systems for this latter purpose, they generally prove unworkable. Typically, the storage requirements of large scale, highly detailed models exceed the total memory and storage capabilities of low-power augmented reality devices. Likewise, computations necessary to display large-scale, highly detailed models generally overburdens the processor of low-power augmented reality devices, low-ering frame rates to a visually objectionable level (e.g., that induces motion sickness). Still further, prior systems have generally not provided an effective mechanism for collaborative simultaneous display to multiple users, and collaborative navigation by such users, of large-scale, highly detailed models.

Given these and other shortcomings, there is a need for improved techniques for enabling large-scale, highly detailed model review using augmented reality devices.

SUMMARY

Techniques are provided for enabling large-scale, highly detailed model review using augmented reality devices. In an example embodiment, an augmented reality device obtains tiles from a remote computing device for an overview resolution. The overview resolution may be selected, for example, based on a comparison of a number of vertices in the model at a given resolution to a threshold. The augmented reality device augments the model at the overview resolution and an overview view size (e.g., a fixed size) into the physical environment at a data location. It then displays the model augmented into the physical environment to a user disposed at a view location. In response to input requesting a change to a new resolution (e.g., an increased resolution), the augmented reality device obtains additional tiles from the remote computing device for the new resolution, augments the model at the new resolution (e.g., the increased resolution) and a new view size (e.g., an increased view size) into the physical environment, and displays the model augmented into the physical environment to the user disposed at the view location. In response to input requesting navigation of the model, the augmented reality device changes at least one of the data location (e.g., pans the model) or the view location (e.g., allow the user to "walk through" the model).

Further, in an example embodiment, the augmented reality device synchronizes the display of the model with second users of one or more second augmented reality devices disposed at second view locations. For example, in response to a change to a new resolution, the second augmented reality device(s) may be caused to display the model augmented into the physical environment at the new resolution and new view size. Likewise, in response to a change to a data location (e.g., panning the model), the second augmented reality device(s) may be caused to display the model augmented into the physical environment at the changed data location. A change to a view location (e.g., "walking through" the model) may have no effect on what is displayed on the second augmented reality device(s). In addition to synchronizing display of the model, indicators of regions viewed by users (e.g., rays from their view location to a region of the model) may be imposed in the display on each of the augmented reality devices, so that each user can readily perceive what other users are looking at.

It should be understood that a variety of additional features and alternative embodiments may be implemented other than those discussed in this Summary. This Summary is intended simply as a brief introduction to the reader for the further description that follows, and does not indicate or imply that the examples mentioned herein cover all aspects of the disclosure, or are necessary or essential aspects of the disclosure.

BRIEF DESCRIPTION OF THE DRAWINGS

The description refers to the accompanying drawings of example embodiments, of which.

DETAILED DESCRIPTION

Figure 1:
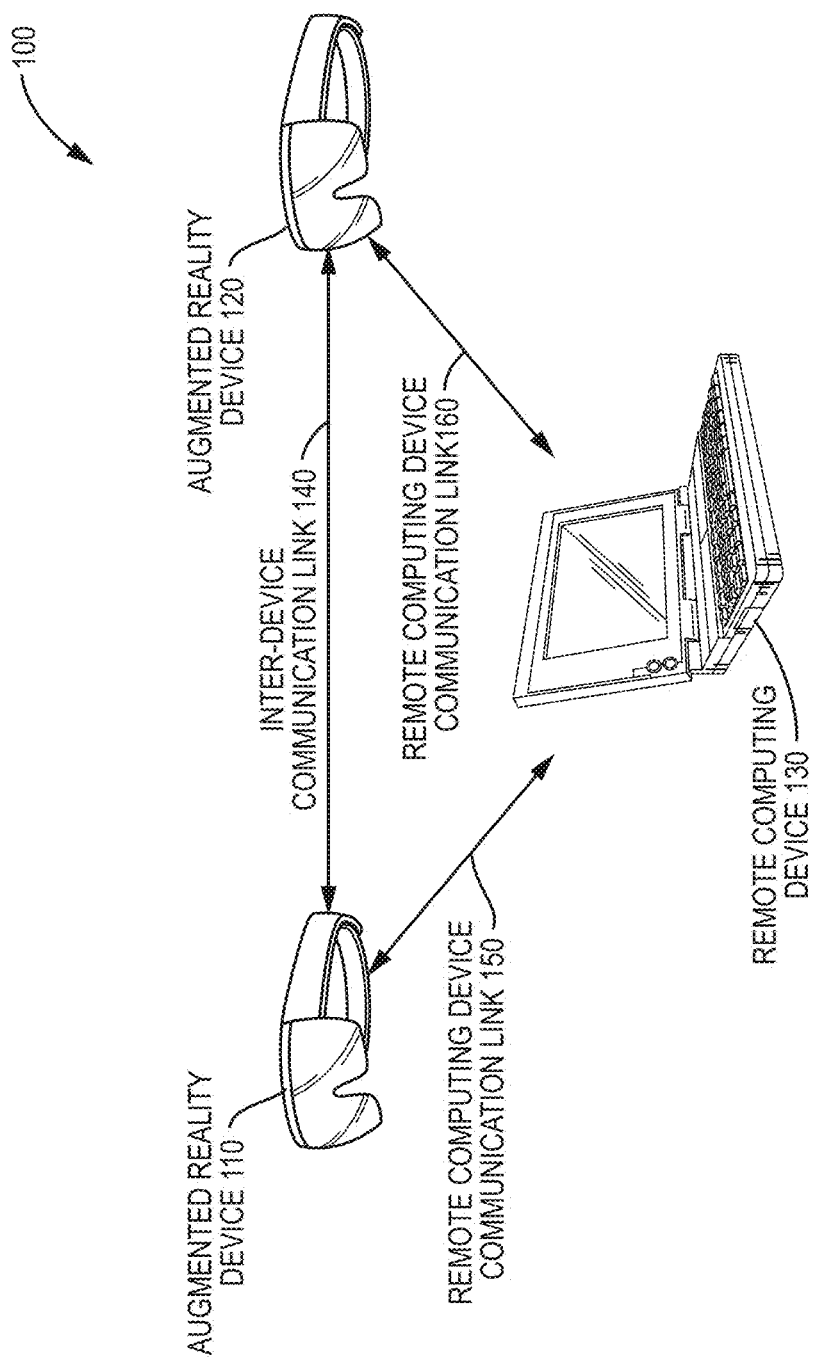
FIG. 1 is a block diagram of an example system for enabling large-scale, highly detailed model review using augmented reality.

FIG. 1 is a block diagram of an example system 100 for enabling large-scale, highly detailed model review using augmented reality. While the example system is capable of collaborative display and navigation, it should be understood that alternative systems may be implemented for use with a single user, and may not necessarily include collaborative features. The example system 100 includes low-power augmented reality devices 110, 120. While two augmented reality devices are shown in this example, it should be understood any number of augmented reality devices may be used.

As used herein, the term "augmented reality device" should be interpreted to include a variety of mobile computing device that that include sensors and a display capable of presenting augmented reality. An augmented reality device may have holographic capabilities. In one implementation, each augmented reality device 110, 120 is a pair of augmented reality-capable smartglasses, for example, a Microsoft HoloLens® head mounted display that includes processing components, such as a system on a chip (SoC) central processing unit (CPU), graphics processing unit (GPU) and supplementary holographic processing unit (HPU) coprocessor, memory components, such as mobile double data rate dynamic RAM (mobile DDR RAM) and static RAM (SRAM), non-volatile storage components, such as an embedded MultiMediaCard (MMC) or other stolid state storage device (SSD), a sensor system that includes components such as an inertial measurement unit, depth camera, photographic video camera, microphones, etc., a display system that includes components such as a widescreen stereoscopic display, a network interface system that includes components such as an IEEE 802.11 Wi-Fi interface and a Bluetooth interface, as well as other hardware components. Alternatively, rather than be augmented reality-capable smartglasses, each augmented reality device 110, 120 may be another type of electronic device, for example, a tablet computer, a smartphone, or other electronic device capable of displaying some form of augmented reality.

Each augmented reality device 110, 120 may store and execute an augmented reality client application (or simply an "augmented reality client") whose software executes at least a portion of the below described techniques for large-scale, highly detailed model review. As explained in more detail below, when there are two or more augmented reality devices 110, 120, the model review may be synchronized between the augmented reality devices. The augmented reality devices 110, 120 may communicate with each other via an inter-device communication link 140 (e.g., established using IEEE 802.11 Wi-Fi, Bluetooth, etc.). While shown as a direct link in FIG. 1, it should be understood that the inter-device communication link 140 may alternatively pass through one or more intermediary devices (e.g., routers, switches, the remote computing device 130, other computing devices, etc.).

The augmented reality devices 110, 120 may further communicate with a remote computing device 130 via remote computing device communication links 150, 160 (e.g. established using IEEE 802.11 Wi-Fi, Bluetooth, etc.). The remote computing device communication links 150, 160 may be used to request and obtain tiles of the model from the remote computing device 130 for a resolution and view size, as explained in more detail below. The remote computing device 130 may be a server, a desktop computer or other computing device having greater processing, memory and/or storage capabilities than the augmented reality devices 110,120. Among other functions, it may store and execute a modeling application that creates or maintains a model, for example, a combined model generated from a reality-based surface mesh and CAD objects that represent planned infrastructure. The model may be structure as a multi-resolution model capable of display at a number of different resolutions (i.e. levels of detail (LODs). Each resolution may be represented by a set of surface tiles (or simply "tiles) (e.g., that form the reality-based surface mesh and combined CAD objects). Further the remote computing device 130 may store and execute an augmented reality server application (or simply "augmented reality server") whose software is structured as a part of a modeling application or separately. As explained below, the augmented reality server may provide tiles of the model upon request to the augmented reality devices 110,120.

The example system 100 may include a variety of other hardware devices. In some implementations, one or more additional computing devices (e.g., desktop or mobile computers) with display screens may be provided and communicate with the remote computing device 130. In such implementations, users of the additional computing devices may be shown the same view of the model augmented into the physical environment shown on one or more of the augmented reality device 110, 120 (e.g., a mirrored view).

When displaying a large scale detailed model review using an augmented reality device 110, 120 with limited processing, memory and storage capabilities, resolution may play an important role in managing the amount of data (e.g., size of the set of tiles) that is transferred from the remote computing device 130 and maintained and processed on the augmented reality device. Managing resolution changes may be enhanced by implementing a variable view size for the model on an augmented reality device 110, 120.

Figure 2:
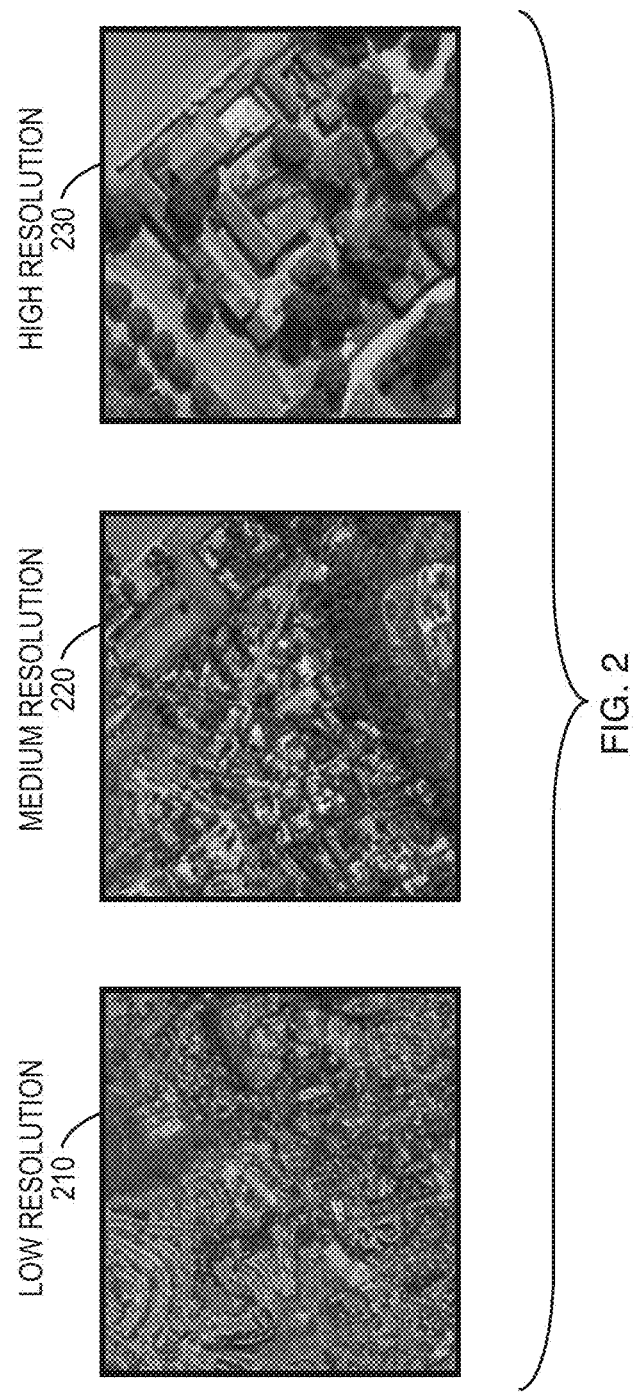
FIG. 2 is a view of a model at low, medium and high resolutions on a display screen of a computing device with a fixed view size.
Figure 3:
FIG. 3 is a view of a model at low, medium and high resolutions on an augmented reality device with variable view size.

Traditionally, when a multi-resolution model is displayed on a display screen of a computing device, while the resolution may change (and different tiles displayed) the view size is fixed. In this context, the term "view size" refers to physical dimensions of a view of a model. FIG. 2 is a view of a model at low, medium and high resolutions 210, 220, 230 on a display screen of a computing device with a fixed view size. While more detail becomes visible at higher resolution, the overall visual area on the display screen inhabited by the model stays the same. In contrast, FIG. 3 is a view of a model at low, medium and high resolutions 310, 320, 330 on an augmented reality device 110, 120 with variable view size. When the resolution is increased the visual area inhabited by the model also increases, causing the user to perceive elements of the model as both larger as well as more detailed. Such variable view size is similar to a user's perception of the physical world, where if they approach an object the object appears both larger as well as more detailed in their visual field. This concept may be embodied in the below described techniques for model review using augmented reality.

Figure 4:
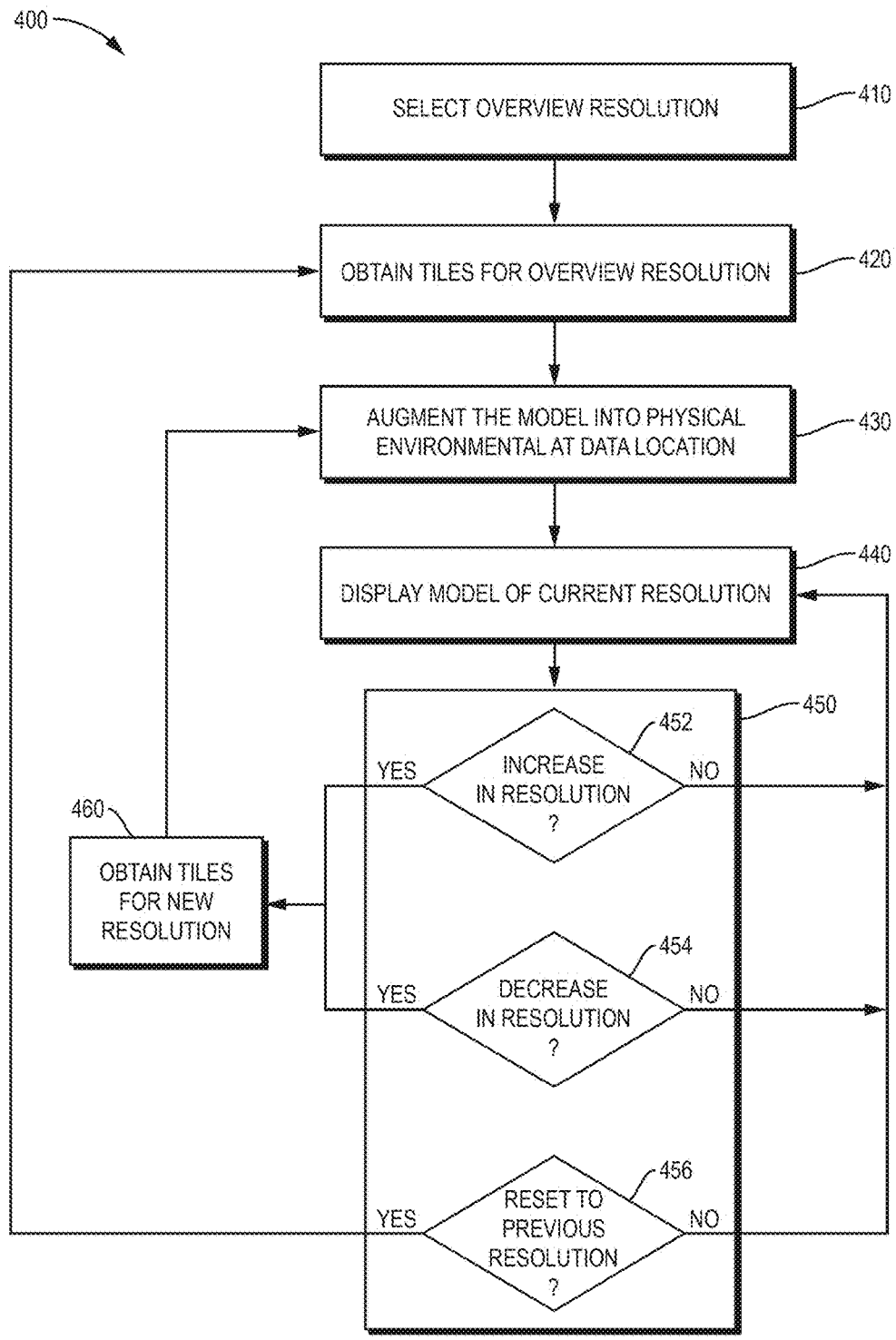
FIG. 4 is a high-level flow diagram of a sequence of steps for model review using augmented reality that may be executed by an augmented reality device of the system of FIG. 1.
Figure 5:
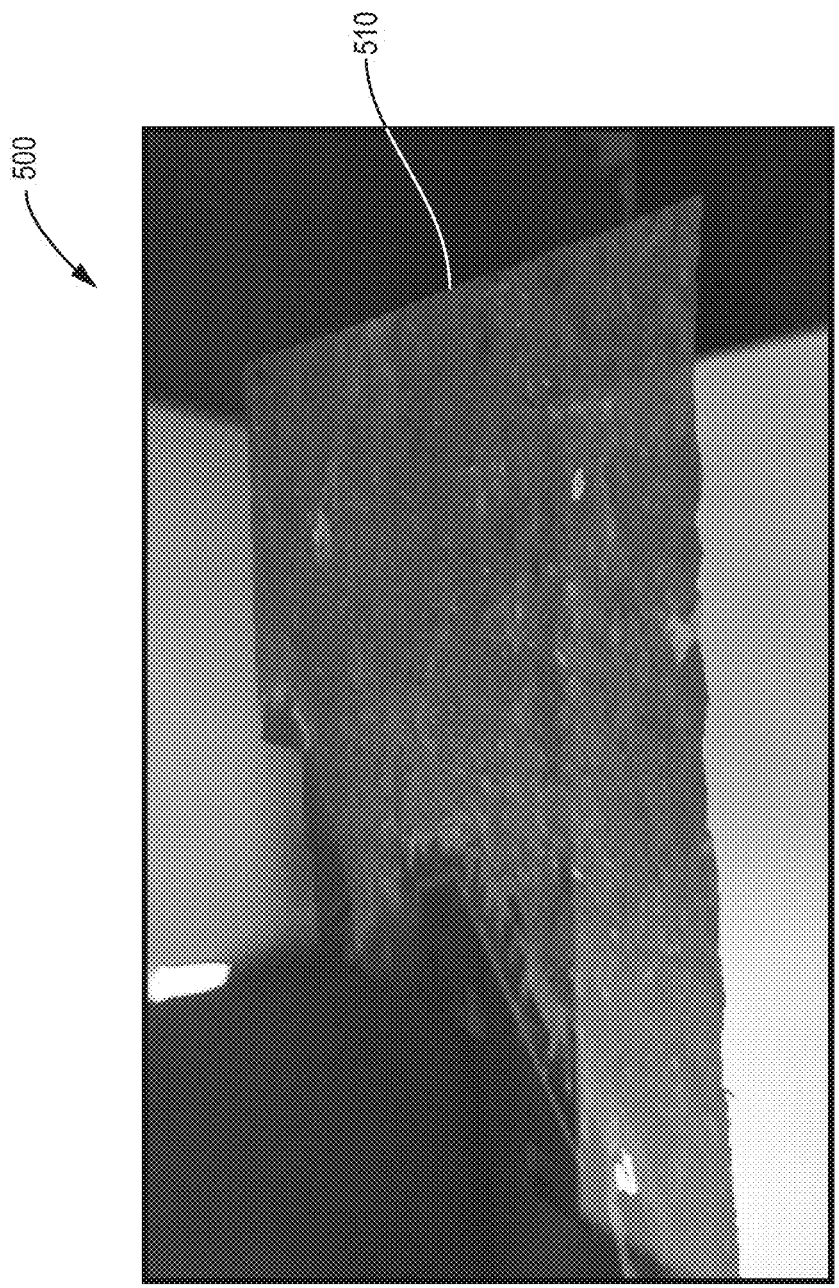
FIG. 5 is a view of an example overview model augmented into the physical environment.

FIG. 4 is a high-level flow diagram of a sequence of steps 400 for model review using augmented reality that may be executed by an augmented reality device 110 of the system 100 of FIG. 1. At step 410, the augmented reality client executing on the augmented reality device 110 selects an overview resolution and overview size for displaying the model. In one implementation, the overview resolution may be selected based on an overview resolution selection process that compares a number of vertices in the model at a given resolution to a threshold. Likewise, in one implementation, the overview size may be selected as a fixed physical size (e.g., 50 cm). It should be understood, however, that other techniques may be utilized to select the overview resolution and overview size. At step 420, a tile loading process of the augmented reality client executing on the augmented reality device 110 obtains tiles for the overview resolution from the remote computing device 130 over the remote computing device communication link 150. At step 430, the augmented reality client executing on the augmented reality device 110 augments the model (initially, an overview model at the overview resolution and the overview view size) into the physical environment at a location (referred to as the "data location"). Then, at step 440, the augmented reality client causes the augmented reality device 11 to display the model (initially, the overview model) augmented into the physical environment to the user disposed at a view location. The view location may be determined by the sensor system of the augmented reality device 110. FIG. 5 is a view 500 of an example overview model 510 augmented into the physical environment. In this example, the overview model represents a general view of a city that may help a user orient themselves with respect to the model and determine areas to explore in more detail.

Figure 6:
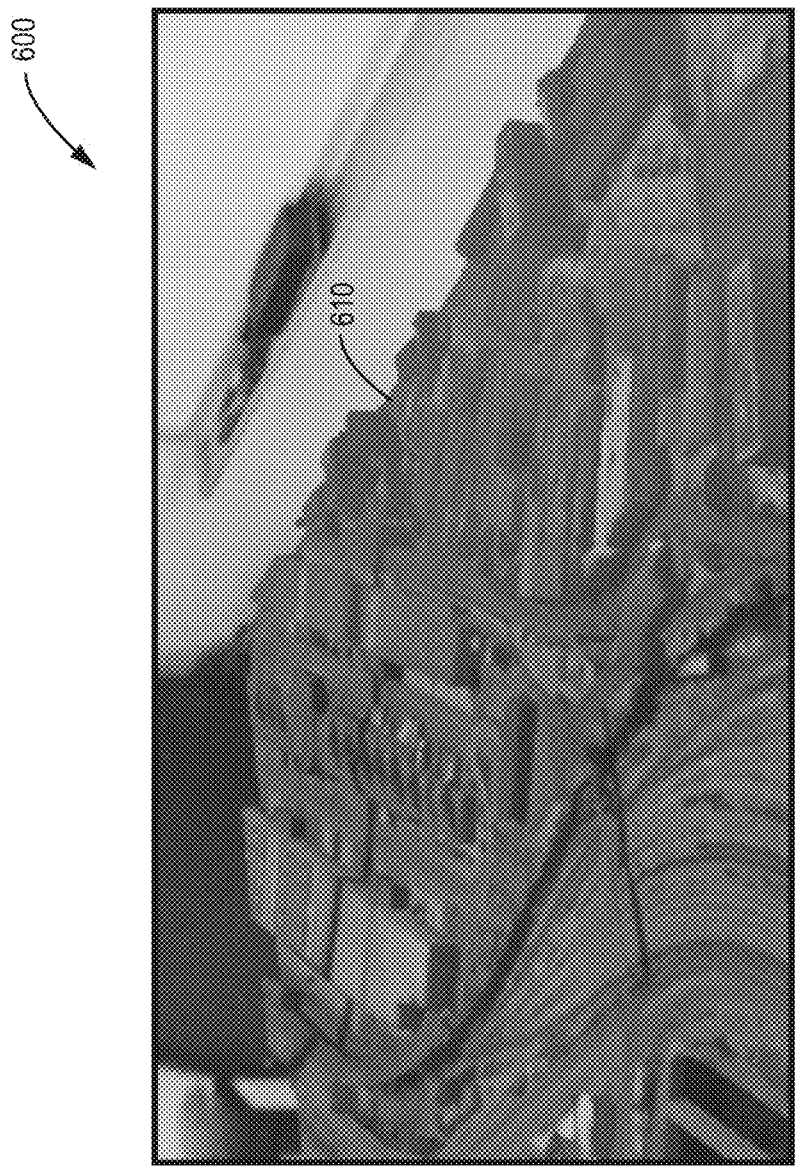
FIG. 6 is a view of an example region of a model with increased resolution and increased view size augmented into the physical environment.

At step 450, the augmented reality client executing on the augmented reality device 110 receives input requesting a change to a new resolution for a region of the model. In one case 252, the input requests an increase in resolution. The input requesting an increase in resolution may take any of a number of forms. In one implementation, the input may be a selection of a location with a hand gesture (e.g., a "click" of the fingers on a location) of a region for which resolution and size is to be increased. The amount of increase in resolution and size may be predetermined fixed amounts (e.g., an 8× increase in resolution and a 10× increase in size) or dynamically determined amounts. Then, at step 460, the tile loading process of the augmented reality client obtains additional tiles for the new (here, increased) resolution of the model from the remote computing device 130 over the remote computing device communication link 150. Execution then loops back to step 430, where the augmented reality client augments the model, or more specifically the region thereof, (now, at the increased resolution and the increased view size) into the physical environment at the data location. At step 440, the augmented reality client causes the augmented reality device 110 to display the model, or more specifically the region thereof, (now at the increased resolution and the increased view size) augmented into the physical environment. FIG. 6 is a view 600 of an example region of a model 610 with increased resolution and increased view size augmented into the physical environment. In this example, the model represents a region of the city shown in FIG. 5, now at increased resolution and increased view size.

In another case 454 of step 450, the input requests a decrease in resolution. The input requesting a decrease in resolution may take any of a number of forms. In one implementation, the input may be a voice command. The amount of decrease in resolution and size may be a predetermined amount or dynamically determined. Then, at step 460, the tile loading process of the augmented reality client obtains additional tiles for the new (here, decreased) resolution of the model from the remote computing device 130 over the remote computing device communication link 150. Execution loops back to step 430, where the augmented reality client augments the model (now, at the decreased resolution and the decreased view size) into the physical environment at the data location. Then at step 440, the augmented reality client causes the augmented reality device 110 to display the model (now at the decreased resolution and the decreased view size).

In another case 456 of step 450, the input requests a reset back to a previous resolution and size, in this example, the overview resolution and overview size. The input requesting a reset may take any of a number of forms. In one implementation, the input may be a voice command. In another implementation, the input may be a hand gesture. Execution then proceeds back to step 420, where the augmented reality device 110 obtains tiles for the overview resolution from the remote computing device 130 over the remote computing device communication link 150. At step 430, the augmented reality client executing on the augmented reality device 110 augments the model (now again at the overview resolution and the overview view size) into the physical environment at the data location, and then, at step 440, the augmented reality client causes the augmented reality device 110 to display the model augmented into the physical environment to the user.

In some circumstances (not shown in FIG. 4), data may not be available to increase or decrease resolution beyond a certain point. In such circumstances, view size only may be increased or decreased in response to input requesting an increase or a decrease in resolution 452, 454.

Figure 7:
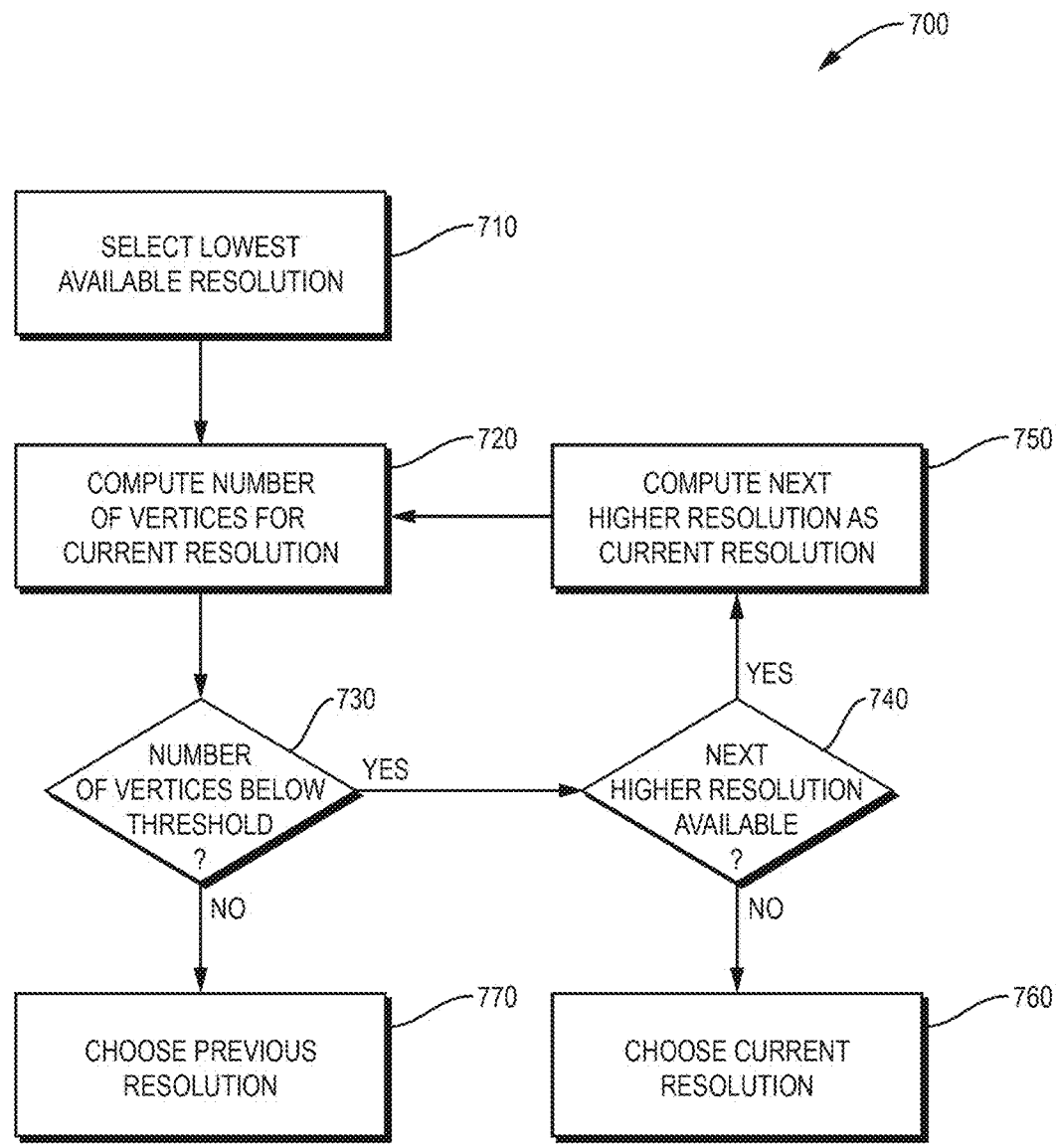
FIG. 7 is a flow diagram for an example sequence of steps for an overview resolution selection process that may be executed as part of FIG. 4.

FIG. 7 is a flow diagram of an example sequence of steps 700 for an overview resolution selection process that may be executed as part of step 410 of FIG. 4. At step 710, overview resolution selection process selects a lowest resolution that is available in the model as a current resolution. At step 720, the overview resolution selection process computes a number of vertices in the model at the current resolution. At step 730, the overview resolution selection process compares the number of vertices in the model at the current resolution to a predetermined threshold. If the number of vertices is below the threshold, execution proceeds to step 740, where the overview resolution selection process determines whether there is a next higher resolution that is available in the model. If there is a next higher resolution available, execution proceeds to step 750, where the next higher resolution is selected as the current resolution and execution loops back to step 720. If there is not a next higher resolution available, execution proceeds to step 760, where the current resolution is selected as the overview resolution. In such case, the current resolution is determined to be the highest available resolution and is used as the overview resolution. If this occurs, since there is no higher resolution available, should input requesting an increase in resolution subsequently be received (e.g., step 452 of FIG. 4), only view size may be increased. If, at step 730, the number of vertices happens to be below the threshold, execution instead proceeds to step 770 where it is determined that the current resolution is too high, and a previous resolution is chosen as the overview resolution.

Figure 8:
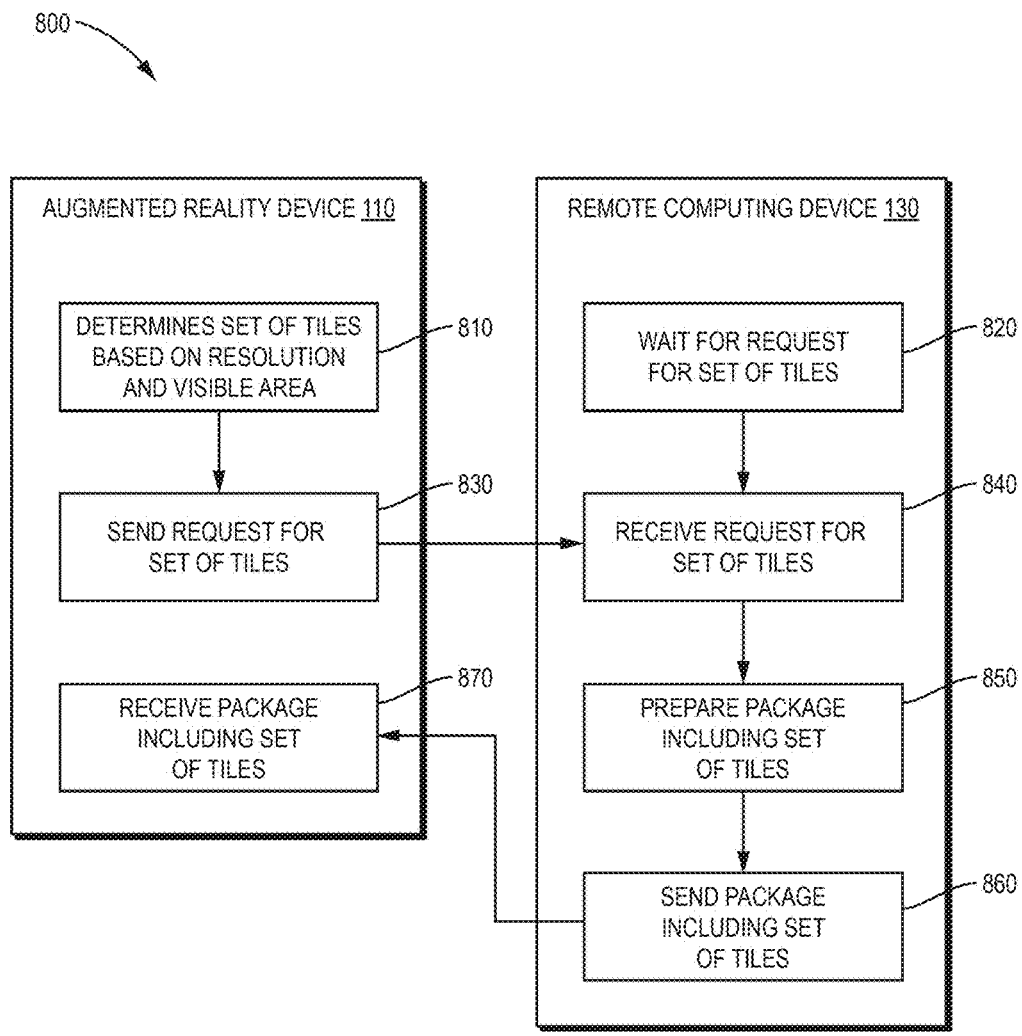
FIG. 8 is a flow diagram of an example sequence of steps for an example tile loading process that may be executed as part of FIG. 4.

FIG. 8 is a flow diagram of an example sequence of steps 800 for an example tile loading process that may be executed as part of step 420 or 460 of FIG. 4. At step 810, the tile loading process of the augmented reality client on the augmented reality device 110 determines a set of required tiles based on the resolution and a visible area of the model determined by the view location. The visible area may be approximated as a rectangle of limited size that works as a frustum with front and back clipping planes. Simultaneously, at step 820, the augmented reality server on the remote computing device 130 waits for requests for tiles. At step 830, the tile loading process of the augmented reality client on the augmented reality device 110 sends a request for the set of required tiles to the remote computing device 130 using the remote computing device communication link 150. At step 840, the augmented reality server on the remote computing device 130 receives the request. At step 850, the augmented reality server on the remote computing device 130 prepares a package including the set of required tiles, by loading the tiles from memory or a storage device and optimizing their format for transmission (e.g., compressing the tiles). At step 860, the augmented reality server on the remote computing device 130 sends the package including the set of required tiles back to the augmented reality device 110. At step 870, the tile loading process of the augmented reality client on the augmented reality device 110 receives the package including the set of required. Subsequently, the newly received tiles may be displayed (e.g., as part of step 440 of FIG. 4).

Figure 9:
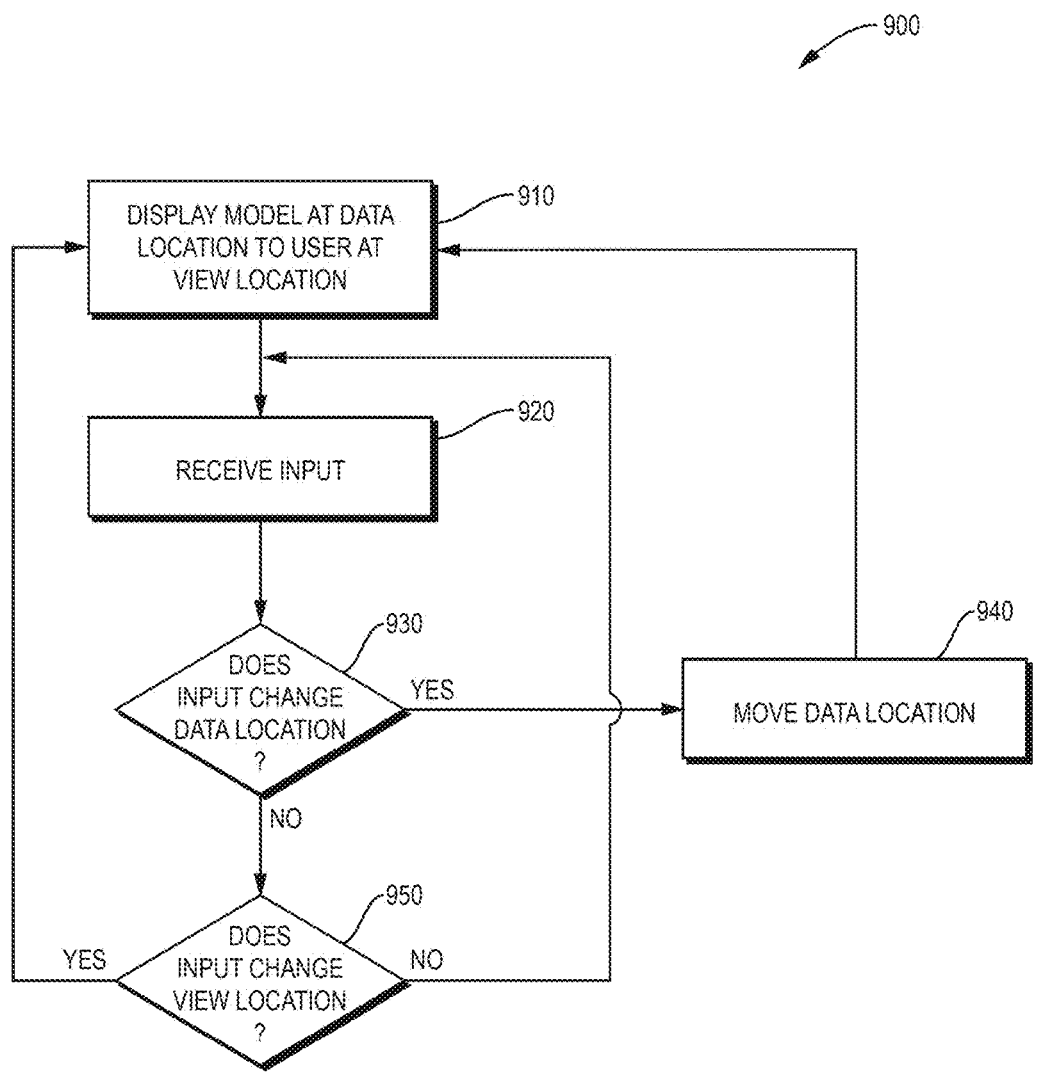
FIG. 9 is a flow diagram of an example sequence of steps of a navigation process that may be executed on an augmented reality device.

In addition to selecting the desired resolution, a user may navigate the model. FIG. 9 is a flow diagram of an example sequence of steps 900 of a navigation process that may be executed on the augmented reality device 110. At step 910, the model is displayed augmented into the physical environment at a data location to a user at a view location. Where the model is an overview model, the data location may be selected by the user, for example by selecting a location with a hand gesture (e.g., a "click" of the fingers on a location). Where the model at a different resolution, the data location may be set to a default current location, for example a gaze location (i.e. a location in the center of the user's field of view) or a center of an area being shown at the different resolution. At step 920, input is received for requesting navigation of the model. At step 930, it is determined if the input is changing the data location, for example, by panning the model. The input for changing the data location may take any of a variety of forms. In one implementation, the input is a voice command. If the input is changing the data location, execution proceeds to step 940, where the data location is moved to a different location. Execution then loops back to step 910, where the model is displayed augmented into the physical environment at the changed data location, for example, such that the model appears to have panned with respect to a stationary user. Such panning may be useful in small rooms where the user has limited ability to move about the physical environment.

If, at step 930, it is determined that the input is not changing the data location, execution proceeds to step 950, where it is determined whether the input is the user changing the view location from which the user views the model (e.g., by walking in the physical environment as detected by the sensor system of the augmented reality device). Execution then loops back to step 910, where the model is displayed augmented into the physical environment at the same data location to the user at the new view location. In such manner, it appears that the user has moved through (e.g., walked through) the model. Such moving through the model may be useful in large rooms where the user can roam about the physical environment.

Figure 10:
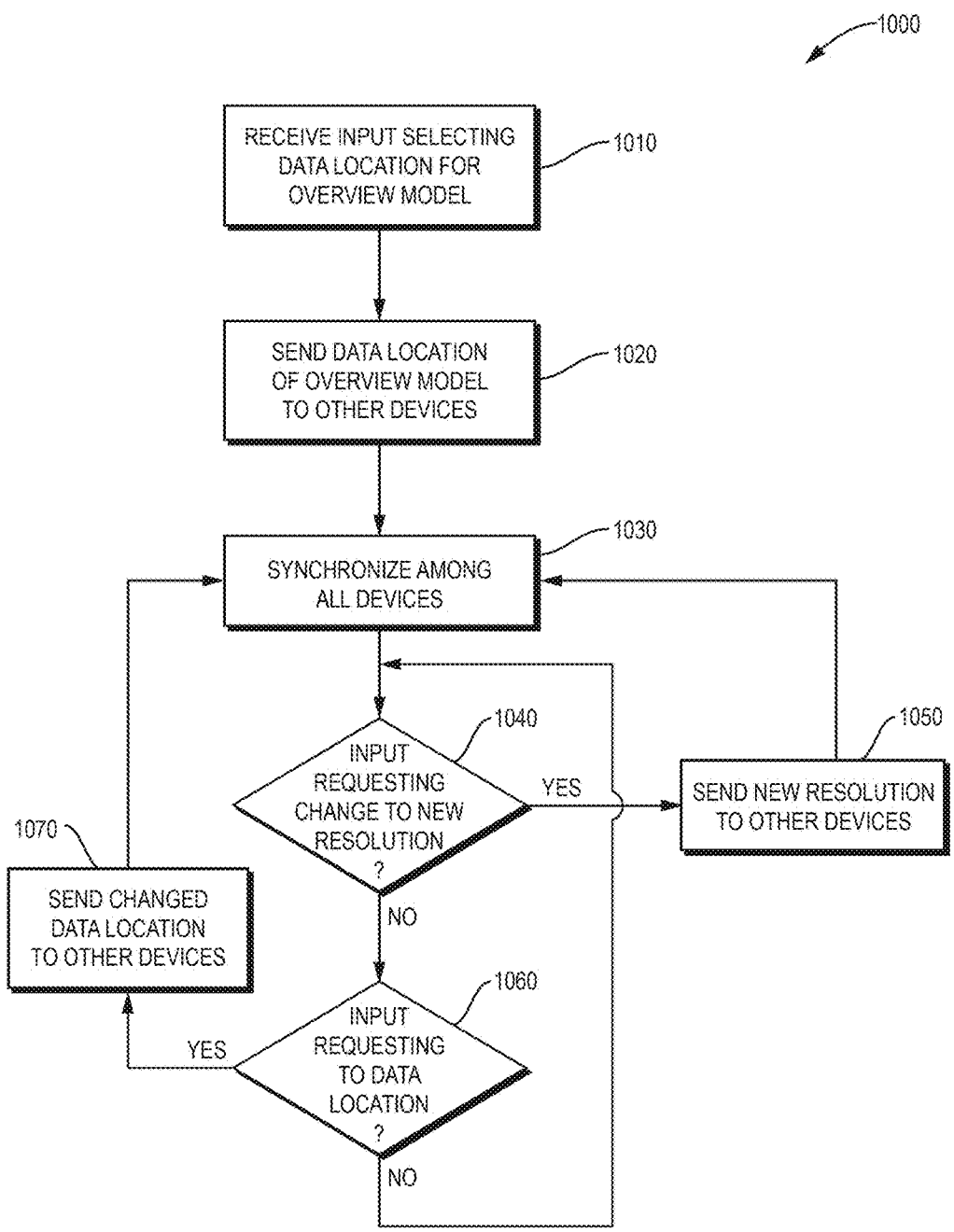
FIG. 10 is a flow diagram of an example sequence of steps for synchronization between two or more augmented reality devices.

When there are two or more augmented reality devices 110, 120 the display and navigation of the model may be synchronized between the augmented reality devices such that the users, while potentially disposed at different view locations, both view the model at the same resolution and view size and augmented into the physical environment at the same data location. The inter-device communication link 140 may be used to pass resolution, view size and data location at which a model is displayed between the augmented reality devices 110, 120 enabling synchronization. FIG. 10 is a flow diagram of an example sequence of steps 1000 for synchronization between two or more augmented reality devices 110, 120. At step 1010, input is received by the augmented reality client on an augmented reality device 110 selecting a data location for the overview model (e.g., by selecting a location with a hand gesture, for instance, "clicking" with the fingers on a location). At step 1020, the augmented reality client on the augmented reality devices 110 sends the data location of the overview model to each other augmented reality device 120 over an inter-device communication link 140. This causes, at step 1030, synchronization among all augmented reality devices 110,120. For example, the augmented reality client on each other augmented reality devices 120 is caused to also display the overview model augmented into the physical environment at the data location.

At step 1040, it is determined whether input requesting a change to a new resolution (e.g., a voice command) is received by an augmented reality client on an augmented reality device 110. If so, at step 1050, the augmented reality client on an augmented reality device sends the new resolution to each other augmented reality device 120 over an inter-device communication link 140. This causes, at step 1030, another synchronization among all augmented reality devices 110,120. For example, the augmented reality client on each other augmented reality devices 120 is caused to also display the model augmented into the physical environment At step 1060, it is determined whether input requesting a change to the data location in the physical environment (e.g., a "click" of the fingers on a location) is received by an augmented reality client on an augmented reality device 110. This causes, at step 1030, another synchronization among all augmented reality devices 110,120. If so, at step 1070, the augmented reality client on an augmented reality device sends the changed data location to each other augmented reality device 120 over an inter-device communication link 140. For example, the augmented reality client on each other augmented reality devices 120 is caused to also display the model augmented into the physical environment at the changed data location. Of note, changing the view location from which the user views the model (e.g., by walking in the physical environment) may not require any synchronization.

Figure 11:
FIG. 11 is a diagram illustrating indicators of regions in a model (here, rays from a view location of users of augmented reality devices to the regions)
Figure 12:
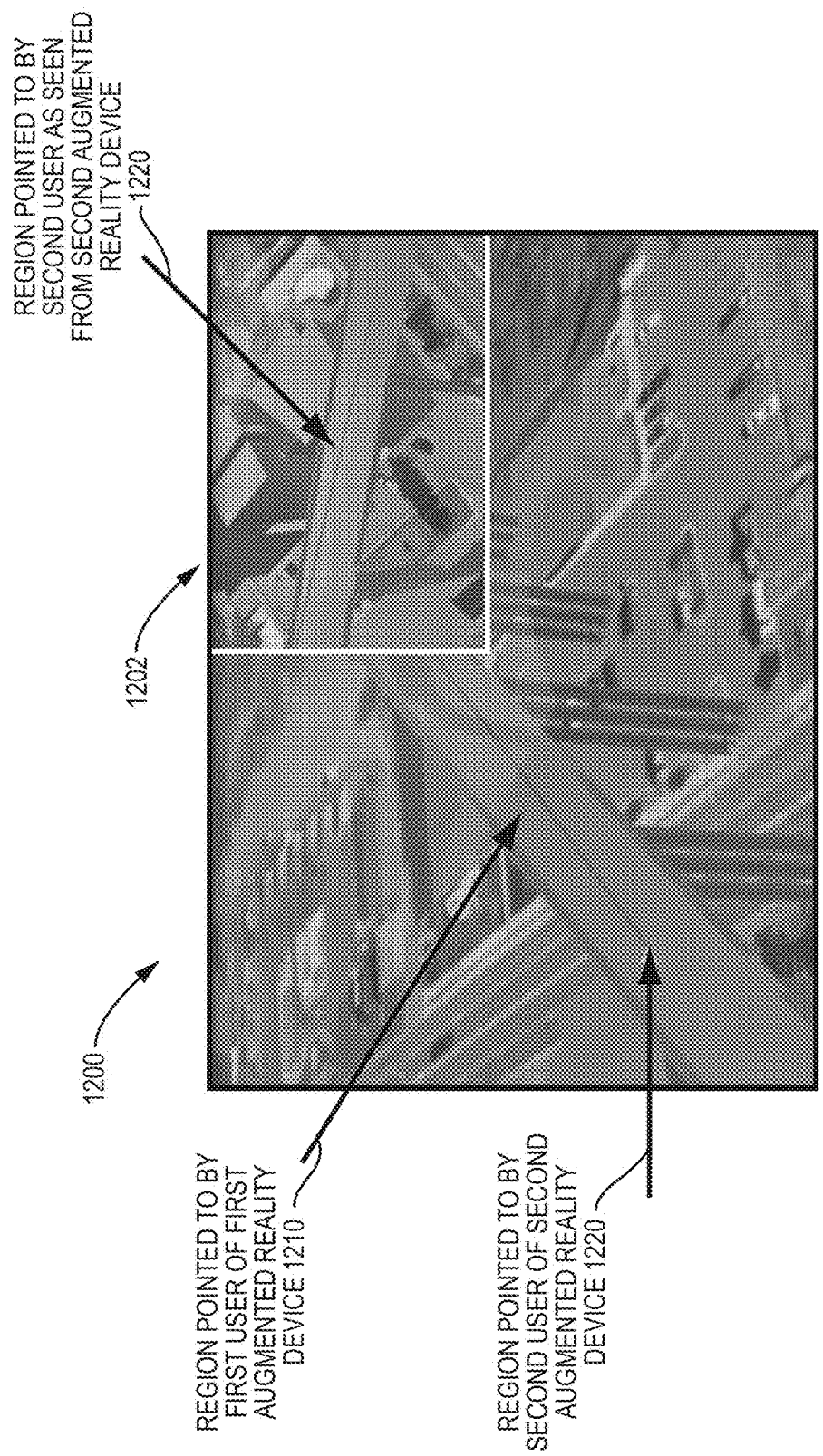
FIG. 12 is a view as seen by a user of an augmented reality device of an indicator of their own viewed region, and a region viewed by a user of a second augmented reality device (here, respectively, rays from respective view locations to the regions).

In addition to synchronizing resolution and data location, the augmented reality client on an augmented reality device 110 may impose an indicator of a region viewed by the user, which is visible to users of other augmented reality devices 120. The indicator may take any of a number of forms. In one implementation, the indicator may be a ray extending from the view location of the user to a region in the model. FIG. 11 is a diagram 1100 illustrating indicators of regions in a model (here rays 1110, 1120 from the view locations of users of augmented reality devices 110, 120 to the regions). FIG. 12 is a view 1200 as seen by a first user of a first augmented reality device 110 showing a region 1210 pointed to by a first user of the first augmented reality device 110 and a second region 1220 pointed to by a second user of a second augmented reality device 120, and an insert showing a second view 1202 as seen by the second user on the second augmented reality device and the second region 1220 pointed to by the second user as seen by the second user. In the views 1200, 1202 indicators are included to identify the regions pointed to (e.g., a rays from respective view locations to the regions, highlighting, etc.). By looking at such indicators, each user can understand what they are pointing to, and what other users are pointing to, in the model, to more readily conduct collaborative model review.

It should be understood that various adaptations and modifications may be readily made to what is described above, to suit various implementations and applications. While it is discussed above that many aspects of the techniques may be implemented in software (e.g., as executable instructions stored in a non-transitory electronic device readable medium for execution on one or more processors) on various specific hardware devices, it should be understood that some or all of the techniques may also be implemented in hardware (e.g., specially configured logic circuits and/or other types of hardware components) and/or as software on other types of hardware devices. Above all, it should be understood that the above descriptions are meant to be taken only by way of example.

What is claimed is:

1. A method for model review using augmented reality, comprising:
    selecting, by an augmented reality device of a user, an overview resolution and an overview size for displaying the model;
    obtaining tiles from a remote computing device for the overview resolution;
    augmenting the model at the overview resolution and the overview view size into a physical environment at a data location;
    displaying, by the augmented reality device, the model augmented into the physical environment to the user disposed at a view location;
    receiving input requesting a change to a new resolution for the model;
    in response to the input requesting the change to the new resolution,
        obtaining additional tiles from the remote computing device for the new resolution,
        augmenting the model at the new resolution and a new view size into the physical environment at the data location, and
        displaying, by the augmented reality device, the model augmented into the physical environment to the user disposed at the view location;
    receiving input requesting navigation of the model; and
    in response to the input requesting navigation of the model, changing at least one of the data location in the physical environment at which the model is augmented or the view location from which the user views the model.

2. The method of claim 1, wherein the overview view size is a fixed view size.

3. The method of claim 1, wherein the overview resolution is selected based on a comparison of a number of vertices in the model at a given resolution to a threshold.

4. The method of claim 1, wherein the obtaining tiles from the remote computing device for the new resolution further comprises:
    determining a set of required tiles based on the new resolution and a visible area of the model based on the view location;
    sending a request for the set of required tiles to the remote computing device; and
    receiving a package including the set of required tiles at the augmented reality device.

5. The method of claim 1, wherein the change to a new resolution is an increase in resolution, a decrease in resolution, or a reset to a previous resolution.

6. The method of claim 1, wherein the input requesting the change to the new resolution is at least one of a selection of a location with a voice command or a hand gesture.

7. The method of claim 1, comprising:
    synchronizing display of the model to the user with a second user of a second augmented reality device disposed at a second view location.

8. The method of claim 7, wherein the synchronizing further comprises:
    causing the second augmented reality device to display the model at the overview resolution at the data location;
    in response to the input requesting the change to the new resolution, causing the second augmented reality device to display the model augmented into the physical environment at the new resolution and the new view size to the second user disposed at the second view location.

9. The method of claim 7, wherein the input requesting navigation of the model is input requesting a change to the data location in the physical environment, and the synchronizing further comprises:
    causing the second augmented reality device to display the model augmented into the physical environment at the changed data location to the second user disposed at the second view location.

10. The method of claim 7, wherein the input requesting navigation of the model is input requesting a change to the view location from which the user views the model, and the synchronizing maintains unchanged the second view location.

11. The method of claim 7, wherein the synchronizing further comprises:

imposing an indicator of a region viewed by the user in the model in the display of the model augmented into the physical environment shown to the second user disposed at the second view location.

12. The method of claim 11, wherein the indicator is a ray from the view location of the user to a region in the model.

13. The method of claim 1, wherein the augmented reality device comprises augmented reality capable smartglasses.

14. The method of claim 13, comprising:
synchronizing display of the model with a third user of a desktop or mobile computer to cause the desktop or mobile computer to show on a display screen a same view of the model augmented into the physical environment shown to the user of the augmented reality capable smartglasses.

15. A method for model review using augmented reality, comprising:
augmenting a model into a physical environment at a data location;
displaying, by the first augmented reality device, the model augmented into the physical environment to a first user disposed at a first view location;
receiving input requesting a change to a new resolution for the model; and
in response to the input requesting the change to the new resolution,
displaying, by the first augmented reality device, the model augmented into the physical environment at the new resolution and a new view size to the first user disposed at the first view location.

16. The method of claim 15, further comprising:
synchronizing display of the model to the first user with a second user of a second augmented reality device disposed at a second view location; and
in response to the input requesting the change to the new resolution,
causing the second augmented reality device to display the model augmented into the physical environment at the new resolution and the new view size to the second user disposed at the second view location.

17. The method of claim 15, further comprising:
receiving input requesting a change to the data location in the physical environment.

18. The method of claim 17, further comprising:
synchronizing display of the model to the first user with a second user of a second augmented reality device disposed at a second view location; and
in response to the input requesting the change to the data location,
causing the second augmented reality device to display the model augmented into the physical environment at the changed data location to the second user disposed at the second view location.

19. The method of claim 15, further comprising:
receiving input requesting a change to the first view location from which the first user views the model; and
in response to the input requesting the change to the first view location,
changing the first view location from which the first user views the model augmented into the physical environment.

20. The method of claim 19, further comprising:
synchronizing display of the model to the first user with a second user of a second augmented reality device disposed at a second view location; and
in response to the input requesting the change to the data location,
maintaining unchanged the second view location from which the second user views the model augmented into the physical environment.

21. The method of claim 15, further comprising:
synchronizing display of the model to the first user with a second user of a second augmented reality device disposed at a second view location; and
imposing an indicator of a region in the model in the display of the model augmented into the physical environment shown to the second user disposed at the second view location.

22. The method of claim 21, wherein the indicator is a ray from the first view location of the user to a region in the model.

23. The method of claim 15, wherein the first augmented reality device comprises augmented reality capable smartglasses, and the method further comprises:
synchronizing display of the model with a user of a desktop or mobile computer to cause the desktop or mobile computer to show on a display screen a same view of the model augmented into the physical environment shown to the first user of the augmented reality capable smartglasses.

24. A system for model review using augmented reality, comprising:
a remote computing device storing the model and executing an augmented reality server application; and
an augmented reality device coupled to the remote computing device by a communication link, the augmented reality device executing an augmented reality client application that when executed is operable to:
obtain tiles over the communication link from the augmented reality server application on the remote computing device for an overview resolution;
augment the model at the overview resolution and an overview view size into a physical environment at a data location;
display the model augmented into the physical environment to the user disposed at a view location;
receive input requesting a change to a new resolution for the model;
in response to the input requesting the change to the new resolution,
obtain additional tiles over the communication link from the augmented reality server application on the remote computing device from the remote computing device for the new resolution;
augment the model at the new resolution and a new view size into the physical environment at the data location;
display the model augmented into the physical environment to the user disposed at the view location.

25. The system of claim 24, comprising:
a second augmented reality device coupled to the remote computing device and the augmented reality device by communication links, and
wherein the augmented reality client application that when executed is further operable to:
synchronize display of the model to the user with a second user of the second augmented reality device disposed at a second view location.

26. The system of claim 25, wherein the second augmented reality client application when executed is operable to:
display the model at the overview resolution at the data location;

receive an indication of the new resolution from the augmented reality device; and in response to the indication of the new resolution from the augmented reality device, display the model augmented into the physical environment at the new resolution and the new view size to the second user disposed at the second view location.

27. The system of claim 25, wherein the second augmented reality client application when executed is operable to:

receive an indication of a change to the data location in the physical environment from the augmented reality device; and in response to the indication of the change to the data location from the augmented reality device, display the model augmented into the physical environment at the changed data location to the second user disposed at the second view location.

28. The system of claim 25, wherein the augmented reality client application when executed is further operable to:

change the view location from which the user views the model augmented into the physical environment; and omit notifying the second augmented reality client application of the change to the view location.

* * * * *